United States Patent
Appel

(10) Patent No.: US 9,107,119 B2
(45) Date of Patent: **\*Aug. 11, 2015**

(54) HANDOVER IN LTE USING PARALLEL SNIFFER

(71) Applicant: Broadcom Corporation, Irvine, CA (US)

(72) Inventor: Amir Appel, Kfar-Saba (IL)

(73) Assignee: Broadcom Corporation, Irvine, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/570,138

(22) Filed: Dec. 15, 2014

(65) Prior Publication Data

US 2015/0105079 A1 Apr. 16, 2015

Related U.S. Application Data

(63) Continuation of application No. 13/759,343, filed on Feb. 5, 2013.

(51) Int. Cl.
| H04W 36/00 | (2009.01) |
| H04W 84/18 | (2009.01) |
| H04W 24/02 | (2009.01) |
| H04W 16/16 | (2009.01) |
| H04W 56/00 | (2009.01) |

(52) U.S. Cl.
CPC ...... *H04W 36/0072* (2013.01); *H04W 36/0055* (2013.01); *H04W 16/16* (2013.01); *H04W 24/02* (2013.01); *H04W 56/001* (2013.01); *H04W 84/18* (2013.01)

(58) Field of Classification Search
CPC ..... H04W 16/16; H04W 16/14; H04W 24/02; H04W 56/001; H04W 72/042; H04W 84/045; H04W 24/00; H04W 36/0055; H04W 36/0072; H04L 25/0202
USPC ......... 455/422.1, 434, 436, 438, 450, 452.1, 455/452.2, 453, 502, 524, 561, 501; 370/241.1, 242, 243, 252, 254, 328, 370/329, 330, 331, 332, 333, 350, 498
See application file for complete search history.

(56) References Cited

U.S. PATENT DOCUMENTS 6,563,807 B1 5/2003 Kim et al.
7,151,944 B2 12/2006 Hashem et al.
(Continued)

*Primary Examiner* — Olumide T Ajibade Akonai
(74) *Attorney, Agent, or Firm* — Sterne, Kessler, Goldstein & Fox P.L.L.C.

(57) ABSTRACT

A base station can observe downlink communications of neighboring base stations of neighboring cells to determine operational parameters of these neighboring base stations in a process called sniffing. The base station ceases downlink transmission and/or uplink reception and initiates downlink reception for a duration in time and/or over frequency to form a sniffing window to observe the downlink communications of the one or more neighboring base stations. The sniffing window represents an area in time and/or frequency where downlink communications are not transmitted. The base station determines operational parameters based upon the downlink communications of the one or more neighboring base stations that are observed during the sniffing window. The base station and/or the one or more neighboring base stations can adjust their respective operational parameters such that, on average, each of the base stations within the cellular network should have a substantially similar deviation in their operational parameters.

20 Claims, 6 Drawing Sheets

(56) References Cited

U.S. PATENT DOCUMENTS

| | | |
|---|---|---|
| 8,457,700 B2 | 6/2013 | Boss et al. |
| 2004/0171352 A1 | 9/2004 | Maeda et al. |
| 2010/0035641 A1 | 2/2010 | Kobayashi et al. |
| 2011/0223936 A1 | 9/2011 | Altintas et al. |
| 2012/0115496 A1 | 5/2012 | Soliman et al. |
| 2012/0170545 A1 | 7/2012 | Yamamoto |
| 2013/0136057 A1 | 5/2013 | Skov et al. |
| 2014/0220972 A1 | 8/2014 | Appel |

HANDOVER IN LTE USING PARALLEL SNIFFER

CROSS-REFERENCE TO RELATED APPLICATIONS

The present application is a continuation of U.S. patent application Ser. No. 13/759,343, filed Feb. 5, 2013, which is incorporated herein by reference in its entirety.

BACKGROUND

1. Field of Disclosure

The present disclosure generally relates to a handover in a cellular network and specifically to compensating for frequency errors between base stations within the cellular network to allow the handover of a mobile communication device between the base stations.

2. Related Art

A cellular network, also referred to as a mobile network, represents a radio network distributed over various geographic areas called cells, each cell being served by at least one base station or access point. The base station provides cellular communication to one or more mobile communication devices, such as one or more cellular phones to provide an example, within its geographic area of coverage. The base station can provide coverage over a wide geographic area, such as a few kilometers, to form a macrocell or coverage over smaller geographic areas to form a small cell, such as microcell which is less than two kilometers wide, a picocell which is 200 meters or less wide, or a femtocell which is on the order of 10 meters. Herein, a communication from a base station to one or more communication devices within its geographic area of coverage is referred to as being a downlink communication while a communication from the one or more communication devices to the base station is referred to as being an uplink communication. In frequency-division duplex (FDD) systems, a first portion of the frequency spectrum allocated to the cellular network which is occupied by the downlink communication is referred to as the downlink and a second portion of the frequency spectrum allocated to the cellular network which is occupied by the uplink communication is referred to as the uplink. In time-division duplex (TDD) systems, both uplink and downlink are allocated to the same frequency spectrum.

Multiple cells of the cellular network are logically joined together provide radio coverage over a wide geographic area to enable a large number of mobile communication devices to communicate with each other. Often times, a mobile communication device moves within the cellular network from a first geographic area of coverage of a first base station within a first cell of the cellular network to a second geographic area of coverage of a second base station within a second cell of the cellular network. The first base station and the second base station perform a handover of the mobile communication device when the mobile communication device moves between geographic areas of coverage to ensure communication from the mobile communication device is transferred from the first base station to the second base station. The handover can represent an inter-system handover between base stations of the same cellular network or an intra-system between base stations of different cellular networks.

In some situations, difference in operating frequency, referred to as frequency error, between the first base station and the second base station can prevent the communication from the mobile communication device to transfer or handover from the first base station to the second base station. Rather, the communication can unexpectedly terminate, or drop, as the mobile communication device moves between geographic areas of coverage. Most often, the frequency error relates to a deviation in respective oscillator frequencies between the first base station and the second base station that are used to perform the handover. According to the 3rd Generation Partnership Project—Long Term Evolution (3GPP-LTE) communication standard, the deviation in oscillator frequency error can be up to ±0.25 parts per million (ppm) per base station. The first base station can have a frequency error of 0.25 ppm and the second base station can have a frequency error of −0.25 ppm which can cause a frequency error of approximately 1.0 kHz between the first base station and the second base station in some situations. This frequency error can be significant enough to prevent the handover of the communication from the mobile communication device from the first base station to the second base station.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears.

FIG. 1 graphically illustrates a frame structure of a conventional primary synchronization signal (PSS) and a secondary synchronization signal (SSS) within a 3GPP—LTE compliant cellular network;

FIG. 2 graphically illustrates a cellular network according to an exemplary embodiment of the present disclosure;

Figure 1:
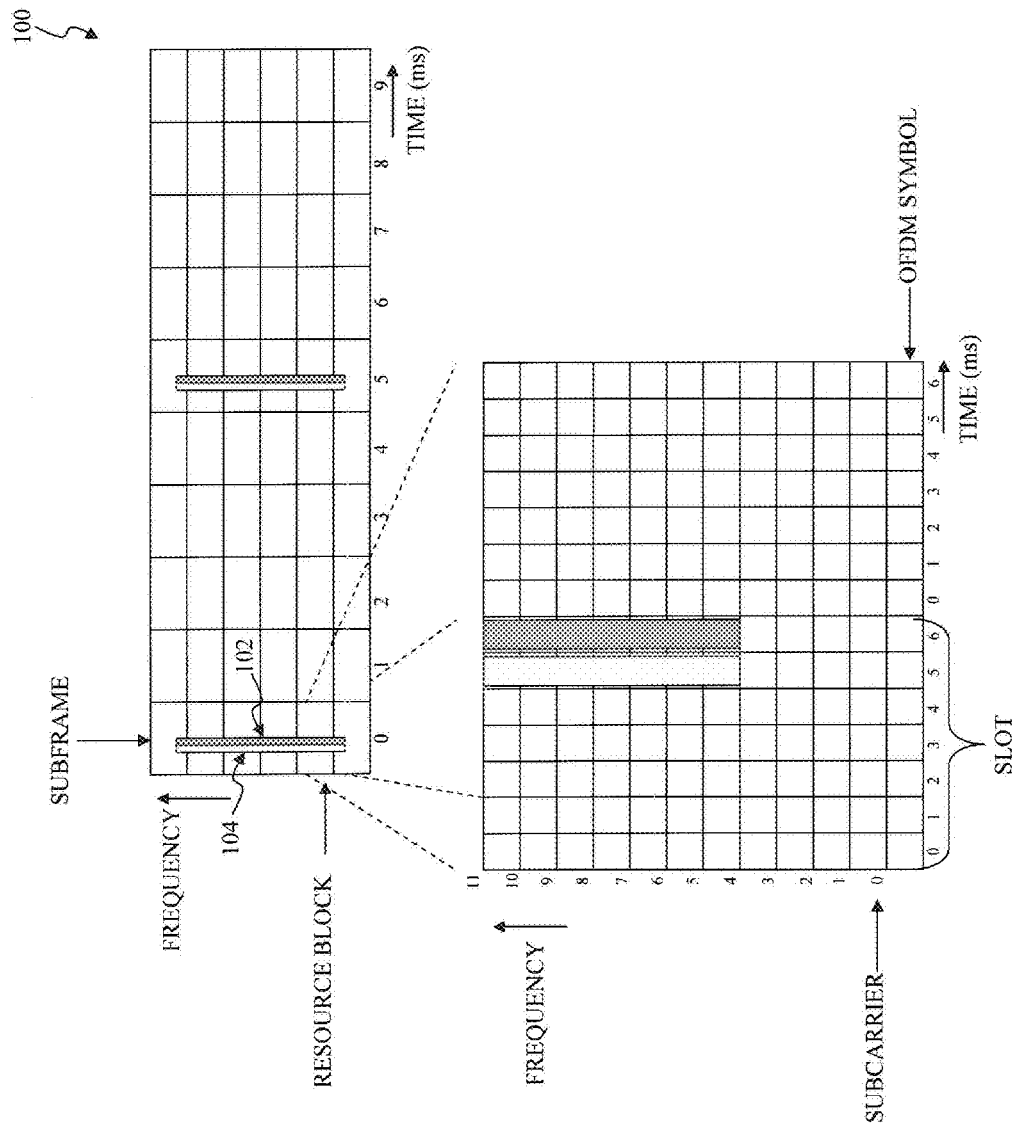

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Overview

A base station can observe downlink communications of neighboring base stations of neighboring cells to determine operational parameters, such as operating frequency, of these neighboring base stations in a process called sniffing. The base station ceases downlink transmission and/or uplink reception and initiates downlink reception for a duration in time and/or over frequency to form a sniffing window to observe the downlink communications of the one or more neighboring base stations. The sniffing window represents an area in time and/or frequency where downlink communications are not transmitted. The base station determines operational parameters based upon the downlink communications of the one or more neighboring base stations that are observed during the sniffing window. The base station and/or the one or more neighboring base stations can adjust their respective operational parameters such that, on average, each of the base stations within the cellular network should have a substantially similar deviation in their operational parameters.

Primary Synchronization Signal (PSS) and Secondary Synchronization Signal (SSS)

FIG. 1 graphically illustrates a frame structure of a conventional primary synchronization signal (PSS) and a secondary synchronization signal (SSS) within a 3GPP—LTE compliant cellular network. According to the 3GPP—LTE communication standard, a base station within a cellular network provides various synchronization signals, such as a primary synchronization signal (PSS) 102 and/or a secondary synchronization signal (SSS) 104 to provide some examples, in its downlink using one or more radio frames. The base station can time-division duplex (TDD) or frequency-division duplex (FDD) downlink communication, such as the PSS 102 and the SSS 104, with uplink communication. As shown in FIG. 1, a basic type 1 LTE frame 100 for use in FDD cellular networks has an overall duration of 10 ms. which is divided into ten subframes having a duration of 1 ms each. Each of the ten subframes consists of two slots having a duration of 0.5 ms in length. Each of the two slots consists of either seven OFDM symbols for a normal cyclic prefix as shown in FIG. 1 or six OFDM symbols for an extended cyclic prefix. Each OFDM symbol is transmitted across six resource blocks, each of which consists of twelve consecutive subcarriers, or 180 kHz, for the duration of one slot. Not show in FIG. 1, a basic type 2 LTE frame for use in TDD cellular networks also has an overall duration of 10 ms. which is divided into two half frames having a duration of 5 ms each. The two half frames are further divided into five sub-frames having a duration of 1 ms each.

The PSS 102 and the SSS 104 are used by mobile communication devices within a geographic area of coverage of the base station to synchronize to the base station and to determine an identity of the base station. As shown in FIG. 1, the PSS 102 can be located in the last OFDM symbol of the first slot of subframes 0 and 5 for FDD cellular networks. The SSS 104 immediately precedes the PSS 102, namely in the second to last OFDM symbol of the first slot of subframes 0 and 5. Not show in FIG. 1, the PSS 102 can be located in the third OFDM symbol of subframes 1 and 6 and the SSS 104 can be located three OFDM symbols ahead of the PSS 102 in TDD cellular networks.

Figure 2:
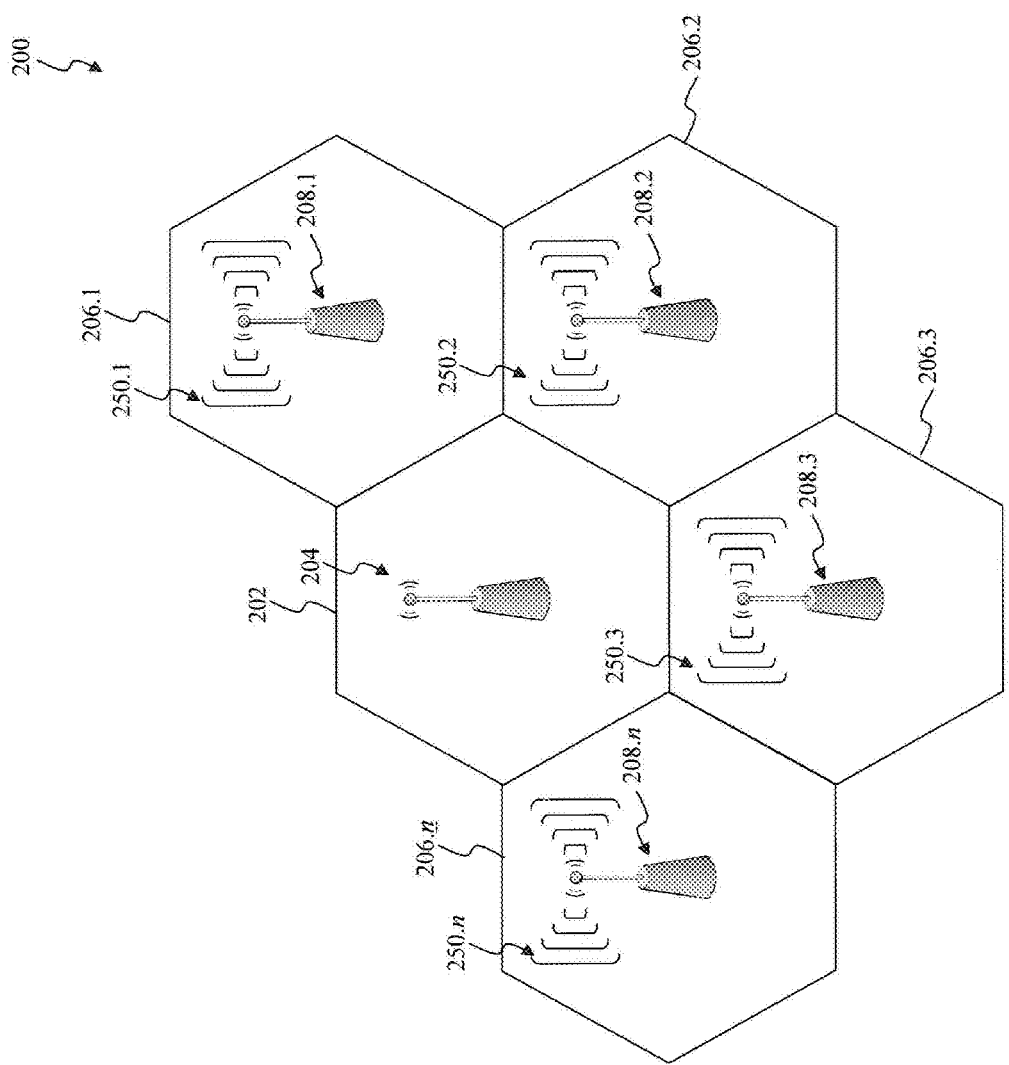

Sniffing for PSS and/or SSS that are Broadcast by Neighboring Base Stations of Neighboring Cells FIG. 2 graphically illustrates a cellular network according to an exemplary embodiment of the present disclosure. A first base station 204 within a first cell 202 of a cellular network 200 can sniff synchronization signals, such as primary synchronization signals (PSSs) and/or secondary synchronization signals (SSSs) to provide some examples, provided by one or more second base stations 208.1 through 208.n within one or more second, neighboring cells 206.1 through 206.n of the cellular network 200. Each of the first cell 202 and/or the one or more second, neighboring cells 206.1 through 206.$n$ can represent a macrocell, a microcell, a picocell, a femtocell, or any combination thereof. Often times, base stations within a microcell, a picocell, or a femtocell are referred to as wireless access points or simply access points. Although the discussion to follow is described in terms of a base station, those skilled in the relevant art(s) will recognize that the disclosure to follow is equally applicable to an access point within the microcell, the picocell, or the femtocell without departing from the spirit and scope of the present disclosure.

As illustrated in FIG. 2, the one or more second base stations 208.1 through 208.$n$ within the one or more second, neighboring cells 206.1 through 206.$n$ of the cellular network 200 provide synchronization signals 250.1 through 250.$n$. Typically, the one or more second base stations 208.1 through 208.$n$ broadcast the synchronization signals 250.1 through 250.$n$ in their respective downlinks to allow mobile communication devices within their respective geographic areas of coverage to synchronize to a corresponding one of the one or more second base stations 208.1 through 208.$n$ and to determine an identity of the corresponding one of the one or more second base stations 208.1 through 208.$n$. In an exemplary embodiment, each of the synchronization signals 250.1 through 250.$n$ can represent the PSS 102 and the SSS 104 of a 3GPP—LTE standard compliant cellular network.

The first base station 204 within the first cell 202 of the cellular network 200 can operate in a normal mode of operation or a sniffing mode of operation. The first base station 204 provides cellular communication to one or more mobile communication devices within its geographic area of coverage in the normal mode of operation. In the sniffing mode of operation, the first base station 204 can observe the synchronization signals 250.1 through 250.$n$ in the respective downlinks of the one or more second base stations 208.1 through 208.$n$ in a process called sniffing. The sniffing of the synchronization signals 250.1 through 250.$n$ by the first base station 204 can occur at the same time using the same bandwidth as downlink communications from the one or more second base stations 208.1 through 208.$n$.

The first base station 204 ceases downlink transmission and/or uplink reception and initiates downlink reception for a duration in time and/or over frequency to form a sniffing window to observe the synchronization signals 250.1 through 250.$n$ in the sniffing mode of operation. The sniffing window can be characterized as being a duration in time and/or over frequency whereby the first base station 204 attempts to observe the synchronization signals 250.1 through 250.$n$. Often times, the duration in time and/or the frequency of the sniffing window is to coincide with time and/or frequencies that are not currently be used by the one or more mobile communication devices within the geographic area of coverage of the first base station 204. Typically, the sniffing window can be characterized as being periodic whereby the first base station 204 periodically ceases the downlink transmission and/or the uplink reception and initiates the downlink reception in an attempt to sniff the synchronization signals 250.1 through 250.$n$ and/or can be as being aperiodic whereby the first base station 204 randomly or pseudo-randomly ceases the downlink transmission and/or the uplink reception and initiates the downlink reception in an attempt to sniff the synchronization signals 250.1 through 250.$n$.

In an exemplary embodiment, the first base station 204 and the one or more second base stations 208.1 through 208.$n$ are assumed to be not synchronized in time. In this situation, the synchronization signals 250.1 through 250.$n$ can be broadcasted by the one or more second base stations 208.1 through 208.$n$ in their respective downlinks at different instances in time in their respective downlinks. As a result, the sniffing window may not coincide with any of the synchronization signals 250.1 through 250.$n$ in a single radio frame. Rather, the sniffing window may coincide with at least one of the synchronization signals 250.1 through 250.$n$ in one or more future radio frames.

Afterwards, the first base station 204 determines operational parameters based upon the synchronization signals 250.1 through 250.$n$ that are observed during the sniffing window in the sniffing mode of operation. The first base station 204 and/or the one or more second base stations 208.1 through 208.$n$ can adjust their respective operational parameters such that, on average, the first base station 204 and the one or more second base stations 208.1 through 208.$n$ should have a substantially similar deviation in their operational parameters. For example, the operating frequency of the first base station 204 and the one or more second base stations 208.1 through 208.$n$ can be adjusted such that, on average, the first base station 204 and the one or more second base stations 208.1 through 208.$n$ should have a substantially similar deviation in frequency offset, such as approximately ±0.1 ppm to provide an example, which is small enough to handover communications between the first base station 204 and/or one or more of the one or more second base stations 208.1 through 208.$n$.

In some situations, one of the first base station 204 or the one or more second base stations 208.1 through 208.$n$ can be designated as a master base station and the operational parameters of other non-master base stations, referred to as slave base stations, can be adjusted such that, on average, the master base station and the slave base stations should have a substantially similar deviation in their operational parameters. For example, the operating frequency of the slave base stations can be adjusted such that, on average, the master base station and the slave base stations should have a substantially similar deviation in frequency offset, such as approximately ±0.1 ppm to provide an example, which is small enough to handover communications between the master base station and/or one or more of the slave base stations.

Figure 3:
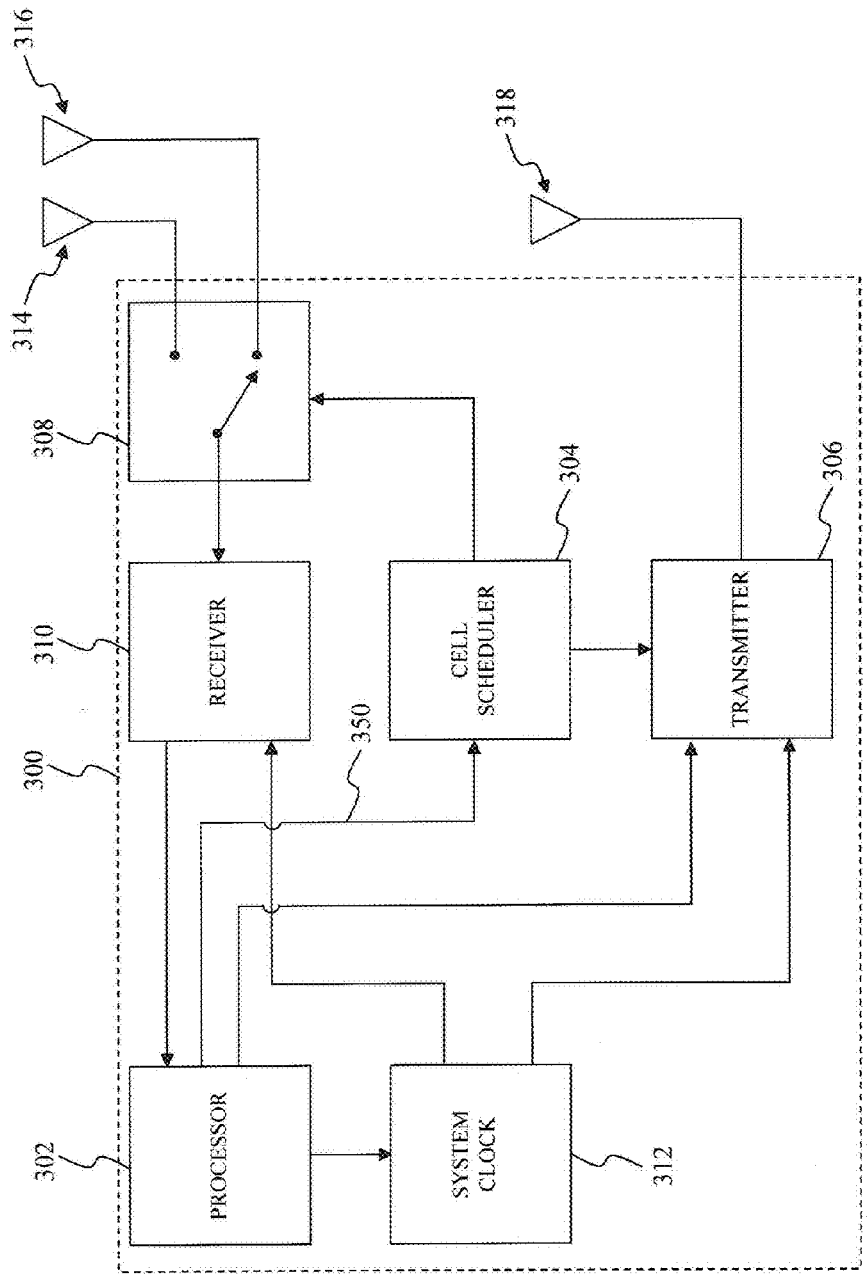
FIG. 3 illustrates a block diagram of an exemplary base station that can be used within the cellular network according to an exemplary embodiment of the present disclosure.

An Exemplary Base Station for Sniffing the PSS and/or the SSS Broadcast by the One or More Neighboring Base Stations FIG. 3 illustrates a block diagram of an exemplary base station that can be used within the cellular network according to an exemplary embodiment of the present disclosure. A base station 300 within a cell of a cellular network 200 can operate in a normal mode of operation or a sniffing mode of operation. The base station 300 provides cellular communication to one or more mobile communication devices within its geographic area of coverage in the normal mode of operation. In the sniffing mode of operation, the base station 300 can observe synchronization signals, such as the PSS 102 and the SSS 104 in a 3GPP—LTE standard compliant cellular network to provide some examples, in respective downlinks of one or more neighboring base stations in a process called sniffing. The base station 300 includes a processor module 302, a cell scheduler 304, a transmitter module 306, a switching module 308, a receiver module 310, a system clock 312, an uplink receiving antenna 314, a downlink receiving antenna 316, and a downlink transmission antenna 318. The base station 300 can represent an exemplary embodiment of the first base station 204.

The processor module 302 controls overall operation and/or configuration of the base station 300. The processor module 302 can provide a mode control signal 350 having a first value to the cell scheduler 304 to configure the base station 300 to operate in the normal mode of operation or the mode control signal 350 having a second value to the cell scheduler 404 to configure the base station 400 to operate in the sniffing mode of operation. Although the processor module 302 is illustrated as being separate from the cell scheduler 304, those skilled in the relevant art(s) will recognize that the processor module 302 and the cell scheduler 304 can be integrated together without departing from the spirit and scope of the present disclosure.

In some situations, the processor module 302 can toggle the mode control signal 350 from the first value to the second value for a duration in time to form a sniffing window to observe the synchronization signals in the sniffing mode of operation. The sniffing window can be characterized as being a duration in time whereby the base station 300 attempts to observe the synchronization signals. Typically, the sniffing window can be characterized as being periodic whereby the base station 300 periodically ceases downlink transmission and/or uplink reception and initiates downlink reception in an attempt to sniff the synchronization signals and/or can be as being aperiodic whereby the base station 300 randomly or pseudo-randomly ceases the downlink transmission and/or the uplink reception and initiates the downlink reception in an attempt to sniff the synchronization signals.

Normal Mode of Operation of the Exemplary Base Station

Figure 4A:
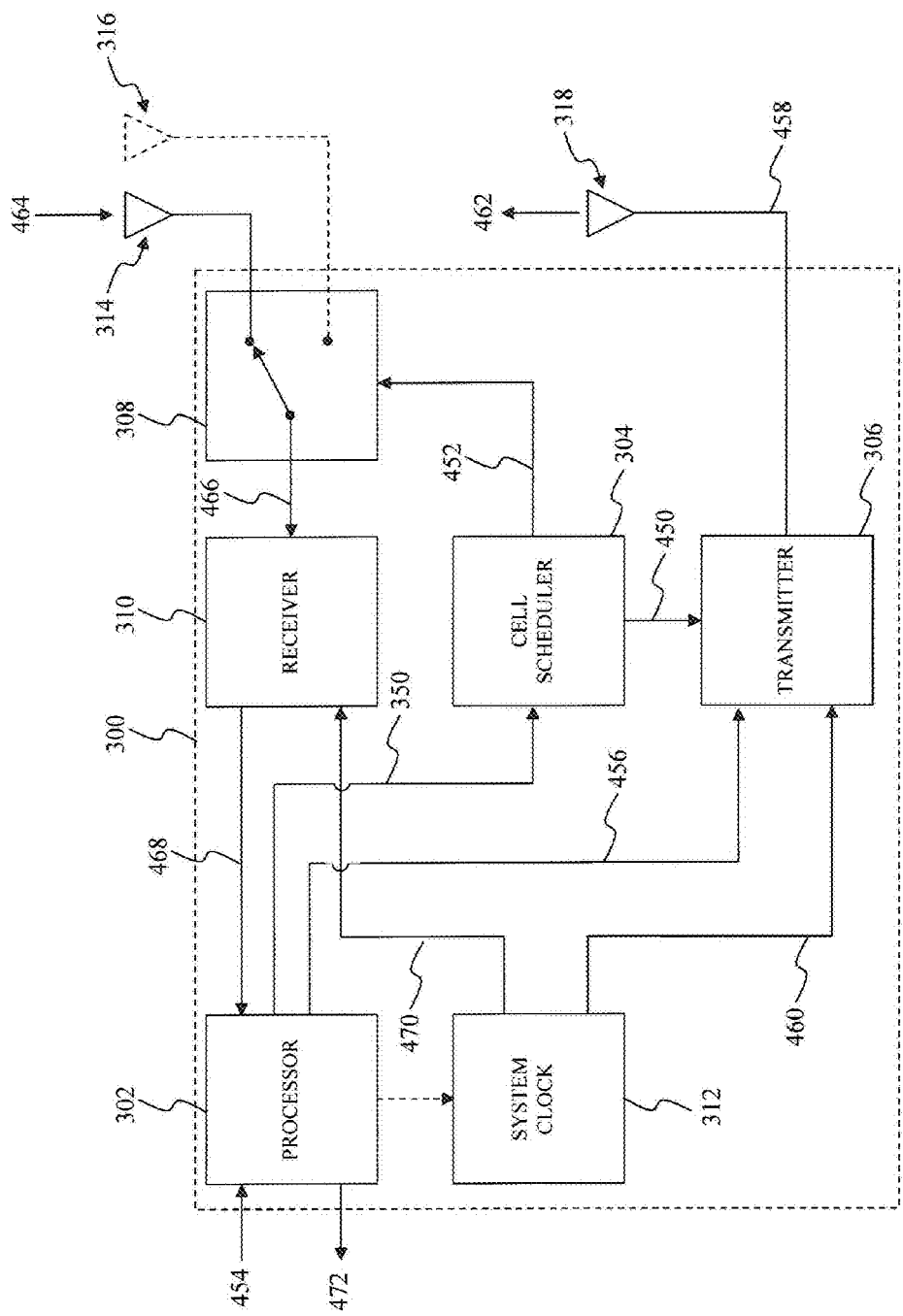
FIG. 4A illustrates a block diagram of the exemplary base station operating in a normal mode of operation according to an exemplary embodiment of the present disclosure.

FIG. 4A illustrates a block diagram of the exemplary base station operating in a normal mode of operation according to an exemplary embodiment of the present disclosure. The cell scheduler 304 configures the base station 300 to operate in the normal mode of operation when the mode control signal 350 is at the first digital value. In the normal mode of operation, the base station 300 provides cellular communication to the one or more mobile communication devices within its geographic area of coverage. Specifically, the cell scheduler 304 provides a transmitter control signal 450 to configure the transmitter module 306 to enable downlink transmission of communication signals and a receiver control signal 452 to the switching module 308 to enable uplink reception of communication signals.

Transmission of Downlink Communication Signals in the Normal Mode of Operation

The processor module 302 receives information 454, such as one or more commands and/or data, from a user interface, such as a touch-screen display, an alphanumeric keypad, a microphone, a mouse to provide some examples, and/or from another electrical, mechanical, or electro-mechanical device that is coupled to the base station 300 in the normal mode of operation. This other electrical, mechanical, or electro-mechanical device or host device can include a mobile telephone, a portable computing device, another computing device such as a personal, a laptop, or a desktop computer, a computer peripheral such as a printer, a portable audio and/or video player, and/or any other suitable electronic device that will be apparent to those skilled in the relevant art(s) without departing from the spirit and scope of the disclosure. The processor module 302 can process the information 454 in accordance with various communication standards or protocols to provide a transmission sequence of data 456. The various communication standards or protocols can include various cellular communication standards such as the 3GPP—LTE communications standard, a fourth generation (4G) mobile communications standard, or a third generation (3G) mobile communications standard, various networking protocols such a Worldwide Interoperability for Microwave Access (WiMAX) communications standard or a Wi-Fi communications standard to provide some examples.

The transmitter module 306 processes the transmission sequence of data 456 in accordance with the various communication standards or protocols to provide a processed sequence of data 458. Specifically, the transmitter module 306 upconverts, modulates, and/or encodes the transmission sequence of data 456 in accordance with the various communication standards using a transmitting clocking signal 460.

The downlink transmission antenna 318 provides a downlink transmission signal 462 to the one or more mobile communication devices within the geographic area of coverage of the base station 300. The downlink transmission antenna 318 converts the processed sequence of data 458 from an electromagnetic current to an electromagnetic wave to provide the downlink transmission signal 462.

Reception of Uplink Communication Signals in the Normal Mode of Operation

Figure 4B:
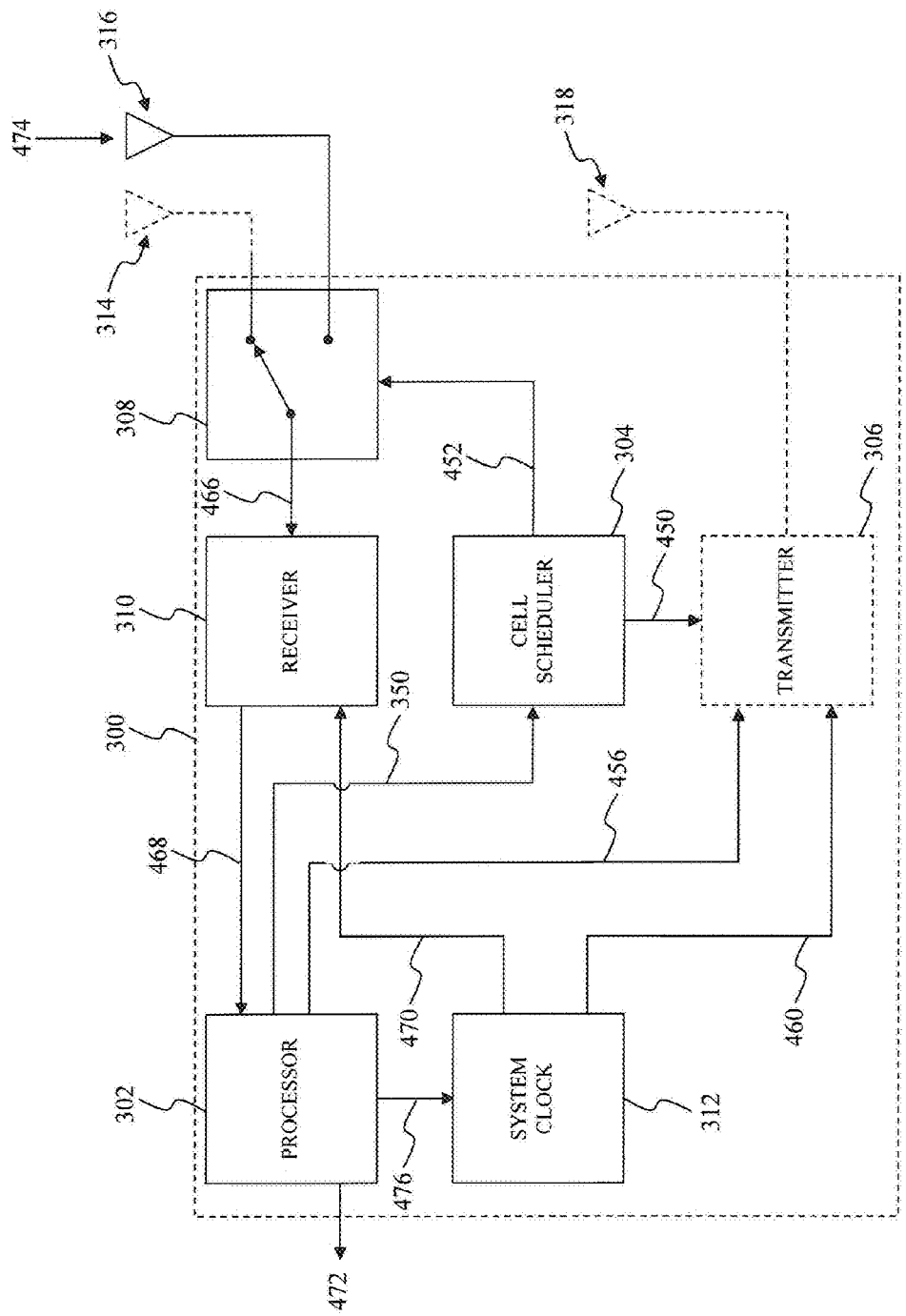
FIG. 4B illustrates a block diagram of the exemplary base station operating in a sniffing mode of operation according to an exemplary embodiment of the present disclosure.

The switching module 308 couples the uplink receiving antenna 314 to the receiver module 310 in the normal mode of operation. The uplink receiving antenna 314 observes an uplink transmission signal 464 from the one or more mobile communication devices within the geographic area of coverage of the base station 300 in the normal mode of operation. The uplink receiving antenna 314 converts the uplink transmission signal 464 from an electromagnetic wave to an electromagnetic current to provide a recovered transmission signal 466. Although a single uplink receiving antenna 314 and a single downlink transmission antenna 318 are illustrated in FIG. 3, FIG. 4A, and FIG. 4B, those skilled in the relevant art(s) will recognize that the base station 300 can include multiple uplink receiving antennas and/or multiple downlink transmission antennas without departing from the spirit and scope of the present invention.

The receiver module 310 processes the recovered transmission signal 466 in accordance with the various communication standards or protocols to provide a processed recovered sequence of 468. Specifically, the receiver module 310 downconverts, demodulates, and/or decodes the recovered transmission signal 466 in accordance with the various communication standards using a receiving clocking signal 470.

The system clock 312 provides the transmitting clocking signal 460 to the transmitter module 306 and the receiving clocking signal 470 to the receiver module 310. Typically, the system clock 312 includes an oscillator that is used to derive the transmitting clocking signal 460 and the receiving clocking signal 470. In some situations, such as aging and/or changes in temperature, voltage, humidity, pressure, and/or vibration, cause a frequency of this oscillator to drift or deviate from its expected value. According to the 3rd Generation Partnership Project—Long Term Evolution (3GPP-LTE) communication standard, the deviation in oscillator frequency error can be up to ±0.25 parts per million (ppm) for a "Home" base station. For other wide area base stations and/or local area base stations, the deviation in oscillator frequency error can be up to ±0.10 ppm.

The processor module 302 processes the processed recovered sequence of data 468 in accordance with the various communication standards or protocols to provide a processed recovered sequence of data 472. The processor module 302 can provide the processed recovered sequence of data to the user interface and/or to the other electrical, mechanical, or electro-mechanical device that is coupled to the base station 300 in the normal mode of operation.

Sniffing Mode of Operation of the Exemplary Base Station

FIG. 4B illustrates a block diagram of the exemplary base station operating in a sniffing mode of operation according to an exemplary embodiment of the present disclosure. The cell scheduler 304 configures the base station 300 to operate in the sniffing mode of operation when the mode control signal 350 is at the second digital value. In the sniffing mode of operation, the base station 300 ceases downlink transmission and uplink reception and initiates downlink reception in an attempt to observe the synchronization signals. Specifically, the cell scheduler 304 provides the transmitter control signal 450 to configure the transmitter module 306 to disable downlink transmission of communication signals and the receiver control signal 452 to the switching module 308 to enable downlink reception of communication signals to open a sniffing window.

Often times, the cell scheduler 304 opens the sniffing window to coincide with time and/or frequencies that are not currently be used by the one or more mobile communication devices within the geographic area of coverage of the base station 300. For example, the processor module 302 assigns or allocates time that is to be used by the one or more mobile communication devices within the geographic area of coverage of the base station 300. In this example, the processor module 302 provides the mode control signal 350 having the second value when the time is not being used by the one or more mobile communication devices within the geographic area of coverage of the base station 300.

The switching module 308 couples the downlink receiving antenna 316 to the receiver module 310 in the sniffing mode of operation. The downlink receiving antenna 316 observes a downlink transmission signal 474 in respective downlinks of the one or more neighboring base stations in the sniffing mode of operation. The downlink transmission signal 474 includes the synchronization signals, such as the PSS 102 and the SSS 104 in a 3GPP—LTE standard compliant cellular network to provide some examples, in respective downlinks of the one or more neighboring base stations. The downlink receiving antenna 316 converts the downlink transmission signal 474 from an electromagnetic wave to an electromagnetic current to provide the recovered transmission signal 466. Although a single downlink receiving antenna 316 is illustrated in FIG. 3, FIG. 4A, and FIG. 4B, those skilled in the relevant art(s) will recognize that the base station 300 can include multiple downlink receiving antennas without departing from the spirit and scope of the present invention.

The receiver module 310 processes the recovered transmission signal 466 in accordance with the various communication standards or protocols to provide the processed recovered sequence of 468. Specifically, the receiver module 310 down-converts, demodulates, and/or decodes the recovered transmission signal 466 in accordance with the various communication standards using the receiving clocking signal 470.

The processor module 302 attempts to detect the synchronization signals from the processed recovered sequence of 468. The processor module 302 can implement known coherent and/or non-coherent detection method to detect the synchronization signals. In some situations, the base station 300 and the one or more neighboring base stations are not synchronized in time. In these situations, the synchronization signals can be broadcasted the one or more neighboring base stations in their respective downlinks at different instances in time in their respective downlinks. As a result, the base station 300 may not be in the sniffing mode of operation when the synchronization signals are broadcasted the one or more neighboring base stations. The processor module 302 determines one or more operating frequencies of the one or more neighboring base stations using the synchronization signals when the synchronization signals are detected from the processed recovered sequence of 468. Thereafter, the processor module 302 calculates a frequency offset between itself and one or more of the one or more neighboring base stations.

Afterwards, the processor module 302 provides a frequency adjustment signal 476 to the system clock 312 to adjust the transmitting clocking signal 460 and/or the receiving clocking signal 470 such that, on average, the base station 300 and the one or more of the one or more neighboring base stations have a substantially similar deviation in their operating frequency.

In some situations, the processor module 302 can cause the base station 300 to enter in the normal mode of operation while measuring the one or more operating frequencies and/or calculating the frequency offset. For example, the operating frequency of the base station 300 and the one or more of the one or more neighboring base stations can be adjusted such that, on average, the base station 300 and the one or more of the one or more neighboring base stations have a substantially similar deviation in frequency offset, such as approximately ±0.1 ppm to provide an example, which is small enough to handover communications between the base station 300 and/or the one or more of the one or more neighboring base stations.

Finally, the processor module 302 returns to the normal mode of operation to allow the base station 300 to provide the cellular communication to one or more mobile communication devices within its geographic area of coverage. Specifically, the cell scheduler 304 provides the transmitter control signal 450 to configure the transmitter module 306 to enable the downlink transmission of the communication signals and the receiver control signal 452 to the switching module 308 to enable the uplink reception of the communication signals. The base station 300 typically remains in the normal mode of operation until the next occurrence of the sniffing window whereby the processor module 302 provides the mode control signal 350 having the second value to the cell scheduler 404 to configure the base station 400 to operate in the sniffing mode of operation.

Exemplary Sniffing Window that can be Used in Sniffing Mode of Operation

Figure 5:
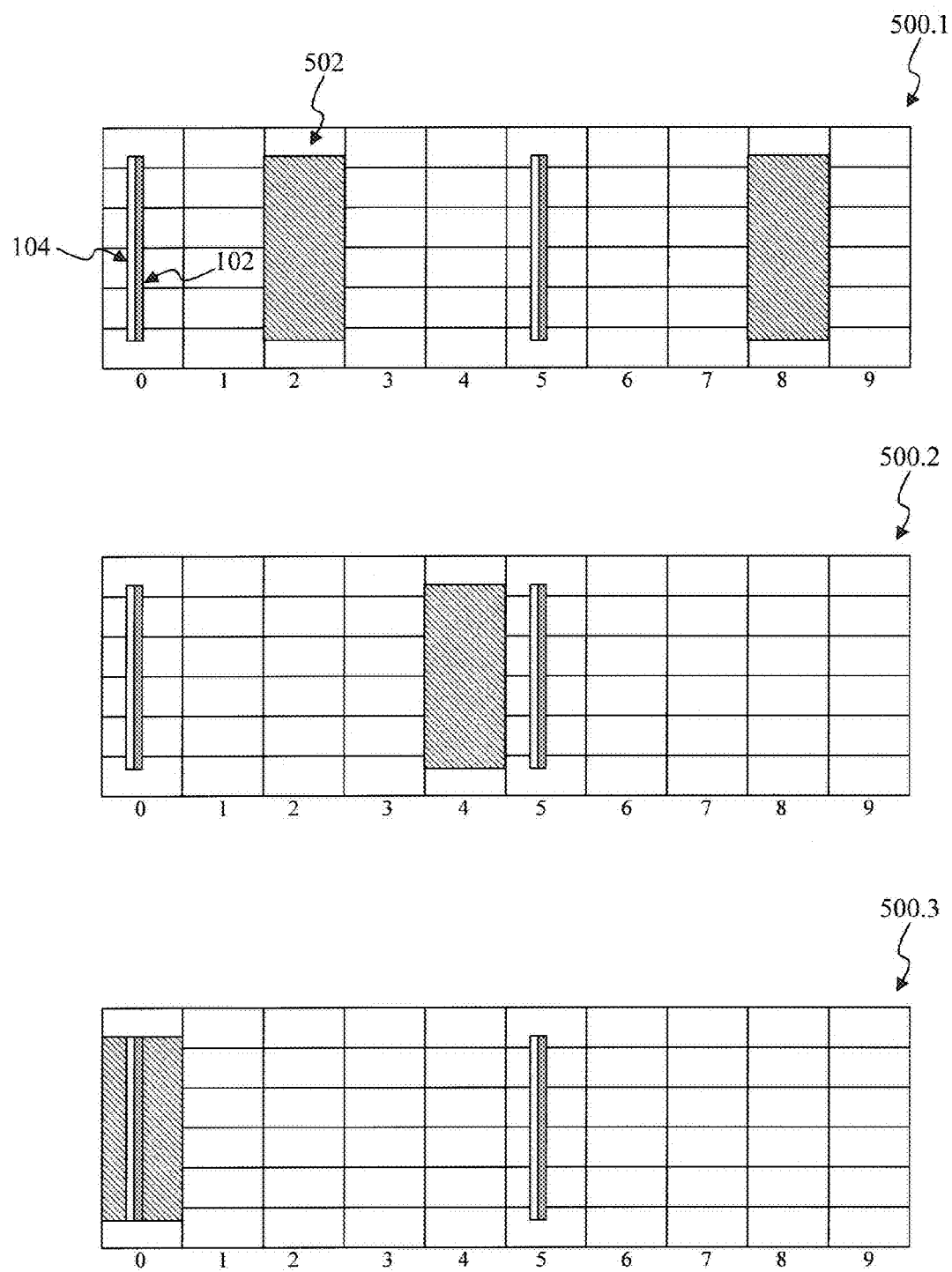
FIG. 5 graphically illustrates an exemplary sniffing window that can be used by a base station to sniff synchronization signals within the cellular network according to an exemplary embodiment of the present disclosure.

FIG. 5 graphically illustrates an exemplary sniffing window that can be used by a base station to sniff synchronization signals within the cellular network according to an exemplary embodiment of the present disclosure. A base station, such as the first base station 204 and/or the base station 300 to provide some examples, provides cellular communication to one or more mobile communication devices within its geographic area of coverage in a normal mode of operation. Thereafter, the base station ceases downlink transmission and/or uplink reception and initiates downlink reception for a duration in time and/or over frequency to form a sniffing window 502 to observe synchronization signals, such as the synchronization signals 250.1 through 250.n to provide an example, that are broadcast by one or more neighboring base stations in their respective downlinks in a sniffing mode of operation. Typically, the base station and the one or more neighboring base stations are assumed to be not synchronized in time. In this situation, the synchronization signals can be broadcasted by the one or more neighboring base stations in their respective downlinks at different instances in time. As such, the base station initiates its downlink reception at different intervals in time and/or frequency in an attempt to sniff the synchronization signals within one or more radio frames 500.

As shown in FIG. 5, the sniffing window 502 has a duration of approximately 1 ms and over a frequency range that at least coincides with a frequency range of the PSS 102 and the SSS 104. However, this example is not limiting, those skilled in the relevant arts will recognize that other sniffing windows are possible without departing from the spirit and scope of the present disclosure. Typically, larger duration allows the sniffing window 502 to coincide with the PSS 102 and the SSS 104 in less radio frames when compared to smaller durations.

The sniffing window 502 can be characterized as being periodic whereby the base station periodically ceases the downlink transmission and/or the uplink reception and initiates the downlink reception in an attempt to sniff the synchronization signals. In this situation, the sniffing window 502 can be characterized as having a periodicity greater than or less than a periodicity of the synchronization signals such that the sniffing window 502 will coincide with the synchronization signals in the one or more radio frames 500. For example, as shown in FIG. 5, the sniffing window 502 can be characterized as having a duration of 1 ms and a periodicity of six subframes which is greater the five subframe periodicity of the PSS 102 and the SSS 104. In this example, assuming that the first instance of the sniffing window 502 coincides with subframe 2 within a first radio frame 500.1, the sniffing window 502 will eventually coincide with the PSS 102 and the SSS 104 at subframe 0 within a third radio frame 500.3. However, this example is not limiting, those skilled in the relevant arts will recognize that other sniffing windows are possible without departing from the spirit and scope of the present disclosure. Typically, shorter periodicity allows the sniffing window 502 to coincide with the PSS 102 and the SSS 104 in less radio frames when compared to larger periodicities.

Alternatively, the sniffing window 502 can be as being aperiodic whereby the base station randomly or pseudo-randomly ceases the downlink transmission and/or the uplink reception and initiates the downlink reception in an attempt to sniff the synchronization signals. In this situation, the sniffing window 502 typically coincides with the synchronization signals approximately 50% of the time for 5GPP—LTE standard compliant cellular networks. For example, the sniffing window 502 typically coincides with the PSS 102 and the SSS 104 approximately 50% of the time when aperiodic.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the present disclosure should not be limited by any of the above-described exemplary embodiments, but should be defined only in accordance with the following claims and their equivalents.

What is claimed is:
1. A cellular network, comprising:
a first base station, within a first cell of the cellular network, configured to provide a downlink communication to a first mobile communication device within a first geographic area of coverage; and
a second base station, within a second cell of the cellular network, configured to cease communication with a second mobile communication device within a second geographic area of coverage during a sniffing window and to sniff the downlink communication for a synchronization signal during the sniffing window,
wherein a periodicity of the sniffing window is different than a periodicity of the synchronization signal.

2. The cellular network of claim 1, wherein the second base station is further configured to determine a first operational parameter of the first base station based upon the downlink communication and to adjust a second operational parameter of the second base station in response to the first operational parameter.

3. The cellular network of claim 2, wherein the first operational parameter and the second operational parameter is a first operating frequency of the first base station and a second operating frequency of the second base station, respectively.

4. The cellular network of claim 1, wherein the sniffing window coincides with a duration in time or a range of frequencies that are not currently being used by the second mobile communication device.

5. The cellular network of claim 1, wherein the second base station is further configured to initiate receiving of the downlink communication.

6. The cellular network of claim 1, wherein the synchronization signal comprises:
a primary synchronization signal (PSS); or
a secondary synchronization signal (SSS).

7. The cellular network of claim 1, wherein the periodicity of the sniffing window is less than the periodicity of the synchronization signal.

8. A base station for use in a cellular network, comprising:
a receiver module configured to cease processing, of an uplink communication from a mobile communication device within the cellular network during a sniffing window and to process a downlink communication from a second base station within the cellular network during the sniffing window, a periodicity of the sniffing window being different than a periodicity of a synchronization signal within the downlink communication; and
a processor configured to detect the synchronization signal within the downlink communication.

9. The base station of claim 8, wherein the periodicity of the sniffing window is less than the periodicity of the synchronization signal.

10. The base station of claim 8, wherein the synchronization signal comprises:
a primary synchronization signal (PSS); or
a secondary synchronization signal (SSS).

11. The base station of claim 8, wherein the processor is further configured to determine a first operational parameter of the second base station based upon the downlink communication and to adjust a second operational parameter of the base station in response to the first operational parameter.

12. The base station of claim 11, wherein the first operational parameter and the second operational parameter is a first operating frequency of the second base station and a second operating frequency of the base station, respectively.

13. The base station of claim 8, further comprising:
a cell scheduler configured to open the sniffing window that coincides with a duration in time or a range of frequencies that are not currently being used by the mobile communication device.

14. The base station of claim 8, wherein the receiver module is configured to cease processing of the uplink communication from the mobile communication device within the cellular network during the sniffing window in a sniffing mode of operation and to process the uplink communication from the mobile communication device in a normal mode of operation.

15. A method for detecting a synchronization signal within a downlink communication, the method comprising:

ceasing, by a first base station, processing of an uplink communication from a mobile communication device within a cellular network during a sniffing window, a periodicity of the sniffing window being different than a periodicity of the synchronization signal; and processing, by a second base station, the downlink communication from the second base station within the cellular network during the sniffing window to detect the synchronization signal.

16. The method of claim 15, wherein the periodicity of the sniffing window is less than the periodicity of the synchronization signal.

17. The method of claim 15, wherein the synchronization signal comprises:

a primary synchronization signal (PSS); or a secondary synchronization signal (SSS).

18. The method of claim 15, further comprising:

opening, by the first base station, the sniffing window that coincides with a duration in time or a range of frequencies that are not currently being used by the mobile communication device.

19. The method of claim 15, further comprising:

determining, by the first base station, a first operational parameter of the second base station based upon the downlink communication; and adjusting, by the first base station, a second operational parameter of the first base station in response to the first operational parameter.

20. The method of claim 19, wherein the first operational parameter and the second operational parameter is a first operating frequency of the second base station and a second operating frequency of the first base station, respectively.

* * * * *

UNITED STATES PATENT AND TRADEMARK OFFICE
CERTIFICATE OF CORRECTION

| | |
|---|---|
| PATENT NO. | : 9,107,119 B2 |
| APPLICATION NO. | : 14/570138 |
| DATED | : August 11, 2015 |
| INVENTOR(S) | : Amir Appel |

It is certified that error appears in the above-identified patent and that said Letters Patent is hereby corrected as shown below:

Claims

In column 12, line 34, Claim 8, replace "processing, of" with --processing of--.

Signed and Sealed this
Twenty-second Day of December, 2015

Michelle K. Lee
*Director of the United States Patent and Trademark Office*